United States Patent [19]

Kunert et al.

[11] Patent Number: 4,681,794
[45] Date of Patent: Jul. 21, 1987

[54] ADHESIVE CONNECTION BETWEEN THE MARGINAL AREA OF A GLASS PANE AND A WINDOW FRAME

[75] Inventors: Heinz Kunert, Cologne, Fed. Rep. of Germany; Luc Vanaschen, Eupen, Belgium; Gerd Cornils, Merzenich-Girbelsrath, Fed. Rep. of Germany

[73] Assignee: Saint-Gobain Vitrage, Paris, France

[21] Appl. No.: 816,440

[22] Filed: Jan. 6, 1986

[30] Foreign Application Priority Data

Jan. 5, 1985 [DE] Fed. Rep. of Germany ....... 3500205

[51] Int. Cl.⁴ ............................................... B32B 3/20
[52] U.S. Cl. .................................... 428/188; 428/194; 52/400; 296/84 A; 296/93
[58] Field of Search .......................... 428/188, 194, 34; 52/400; 296/84 A, 84 R, 93; 16/220

[56] References Cited

U.S. PATENT DOCUMENTS 2,700,196  1/1955  Panhard ............................... 52/400
2,825,941  3/1958  Lux et al. .......................... 52/400 X Primary Examiner—Alexander S. Thomas
Attorney, Agent, or Firm—Oblon, Fisher, Spivak, McClelland & Maier

[57] ABSTRACT

In an adhesive connection between the marginal area of an auto glass pane (1) and the emplacement flange (2) of the window frame of an auto body, a completely enclosed hollow space (8) is provided in the adhesive bead (4) which provides the connection by, e.g., having a hose (7) made of elastic synthetic material embedded in the adhesive bead (4). The hollow space (8) serves as an aid in window removal by being filled with compressed air with the aid of a hollow needle (9). In this way, the elastically or plastically distortable adhesive bead (4) is expanded, and the glass pane is pushed out of the window-frame (3) sufficiently that the separation of the adhesive bead (4) is considerably facilitated.

20 Claims, 8 Drawing Figures

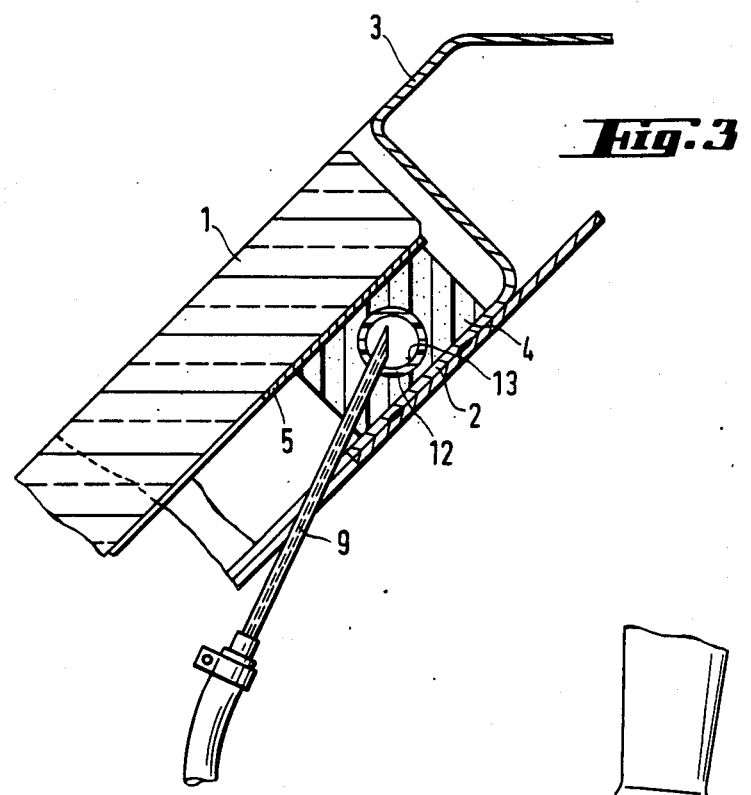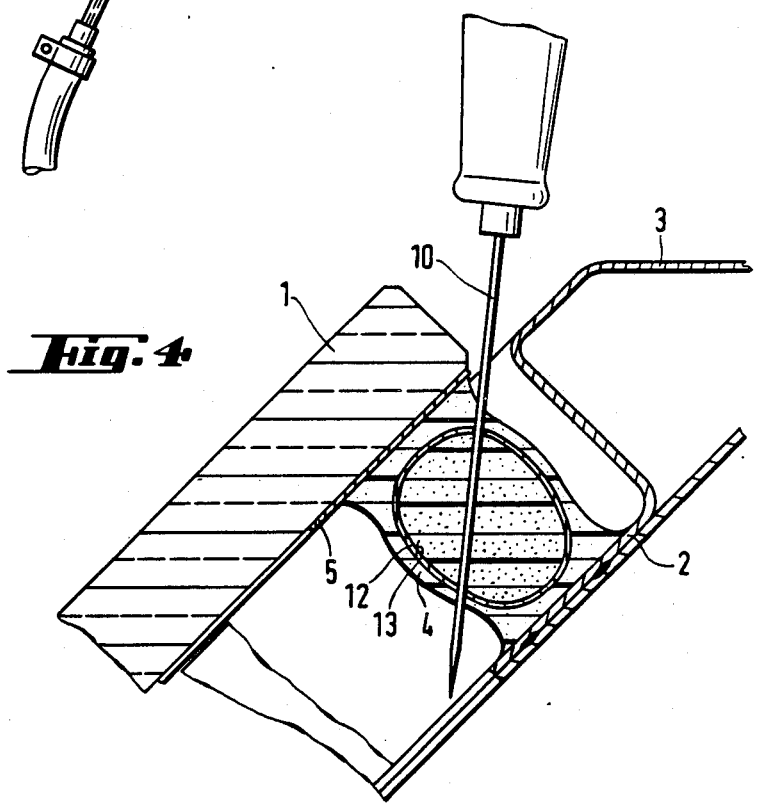

ADHESIVE CONNECTION BETWEEN THE MARGINAL AREA OF A GLASS PANE AND A WINDOW FRAME

BACKGROUND OF THE INVENTION

The invention concerns the formation of an adhesive connection between the marginal area of a glass pane and a window-frame, and in particular concerns such an adhesive connection for the installation of automobile glass panes into the window frames of auto chassises. The invention also incorporates a glass pane equipped with an adhesive bead, as well as devices for the manufacture of the adhesive connection according to the invention, and also procedures for the removal from the window frames of glass panes installed with such adhesive connections.

The installation of glass panes into a window opening is nowadays increasingly accomplished by means of direct adhesion, by having the glass pane glued to the window frame by only one side, rather than having it gripped from both sides, as was formerly done. This fenestration technology is utilized particularly frequently in installing auto glass panes into auto bodies. For this purpose, it is familiar and common to cover over the frontal view of the adhesive bead by a nontransparent frame. Such a covering is known from, e.g., DE-OS No. 20 38 016.

If such an auto windshield has to be replaced at a later point in time, there are difficulties involving the removal of the pane. For the adhesive bead, which has to be separated in such a case is difficult to access. The special tools required for this purpose can easily damage the coating surrounding the window pane, or also the paint layer. Since the adhesive bead has a very tough consistency after being hardened, separation of the adhesive bead is a difficult task, particularly due to the tight working conditions inside the window-frame fold.

The utilization, as a removal tool for the removal of a glued-in auto glass pane, of a piece of wire, which is pushed straight through the adhesive bead at one point and then pulled through the adhesive bead perpendicular to the marginal area of the pane, is known. It is also known to install, at the same time as the application of the bead, a flexible string with a high degree of tensile strength running alongside the adhesive bead in the marginal area of the glass pane, or in its immediate vicinity, which, in case of need, serves directly as a removal tool. In order to separate the adhesive bead with the aid of a removal string, considerable force has to be applied, for the removal string is a relatively dull cutting tool, and the adhesive bead has to be separated along its entire width.

SUMMARY OF THE INVENTION

The present invention addresses the problem of designing an adhesive connection between the glass pane and a window-frame in such a way that the removal of a glass pane will be facilitated, and particularly, can occur with minimal application of force with the aid of a suitable cutting tool, without the danger of damage to the window frame being present.

According to the invention, this problem is solved by providing a completely closed hollow space in the adhesive bead which constitutes the adhesive connection. For the purpose of removal of the glass pane, this hollow space can be filled with a fluid medium under super-pressure.

The closed hollow space need not form a circle closed upon itself when viewed in cross section; rather, it can be interrupted, for instance, at the seam of the adhesive bead, where the beginning and end of the adhesive bead connect with one another. What is important is that the hollow space be sufficiently fluid tight that the pressure medium introduced into it can not escape, so that the super-pressure building upon within the hollow space can expand the adhesive bead, or even explode it. Since the material of the adhesive bead is generally a permanently elastic material with a high breaking tension, the adhesive bead can be expanded to a considerable degree by the super-pressure generated in the hollow space, so that it causes the glass pane to be pushed out of the hollow space altogether by a degree sufficient that, with a suitable cutting tool, the expanded adhesive bead whose cross section has been reduced can be separated through from either inside or outside the body of the auto.

The pressure medium used is preferentially a gas, such as air, under super-pressure, or a liquid, such as water, under super-pressure. If required or useful, it is also possible to use as the pressure medium a rigidifying or hardening liquid which essentially retains its form when the super-pressure is eliminated due to the opening of the hollow space during the separation procedure.

The introduction of the pressure medium is preferably accomplished by means of a hollow needle which is inserted into the adhesive bead as far as the hollow space.

The hollow space in the adhesive bead can be effected in several ways. Thus, for instance, it is possible to extrude the adhesive bead, which is to be applied directly to the glass pane, with the aid of a special nozzle which generates an adhesive bead with a hollow space surrounded on all sides by the mass of the adhesive bead. The material of the adhesive must, in this case, demonstrate a required firmness. On the other hand, it is also possible to place a hose made of some elastic material into the adhesive bead during or after extrusion. By introducing a hose, it is possible to arrange the hollow space at any desired place within the cross-section of the adhesive bead.

As a particularly advantageous further development of this invention, it is provided that even prior to the installation of the glass pane into the auto body, and in fact preferably at the end of the manufacturing process of the glass pane, an extruded adhesive bead be applied along the edge of the glass pane, so that this adhesive bead will then later serve as an intermediate body between the glass pane and the adhesive layer applied to the hardened adhesive bead. This embodiment of the invention has the advantage that the adhesive bead which has already been applied during the manufacturing process of the glass pane simultaneously serves as an edge guard and a buffer during the handling and transportation of the glass panes.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 3 shows a second embodiment of the adhesive connection, likewise in cross-section in the area of the connection between the glass pane and the window frame;

FIG. 4 shows the embodiment of FIG. 3 during the removal procedure of the glass frame;

DESCRIPTION OF THE PREFERRED EMBODIMENTS

Figure 1:
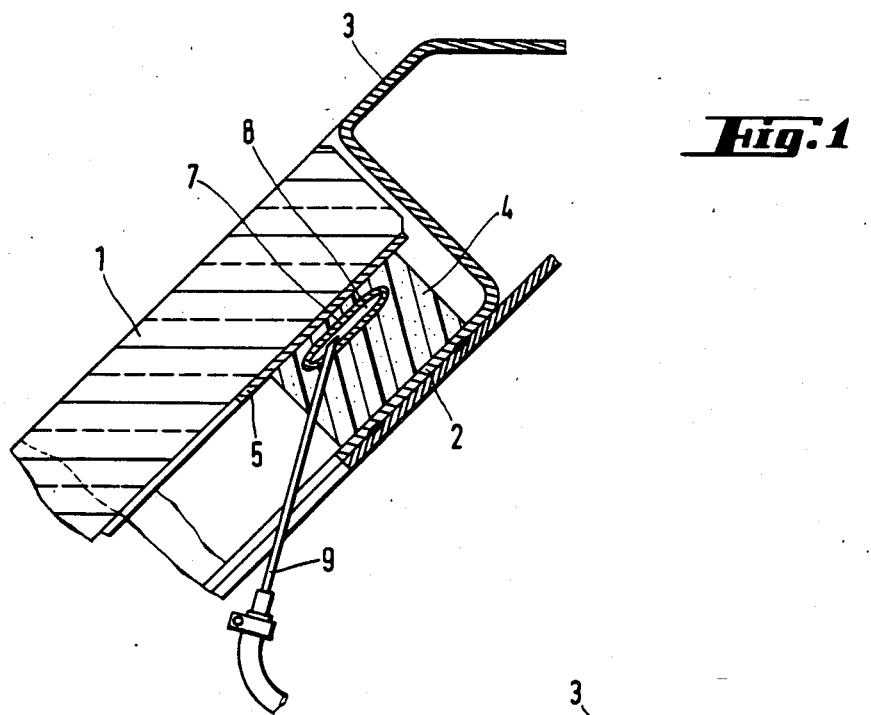
FIG. 1 shows a first embodiment of an adhesive connection according to the invention in cross-section in the area of the connection between the glass pane and the window frame.

As can be seen from FIG. 1, the auto glass pane 1, which may be, e.g., a windshield or a rear-window pane, is glued to the emplacement flange 2 of the window-frame 3 by means of the adhesive bead 4 and nested within the frame. On the glass pane 1, a frame-type coating 5 made of a non-transparent material, particularly of a baked ceramic, is applied along the edge. Between the adhesive bead 4 and the surfaces of the glass pane 1, and also between the adhesive bead 4 and the emplacement flange 2, to which the adhesive bead sticks, one or more adhesion-enhancing layers may be applied in a known manner. Particularly suitable as adhesive materials are moisture curable single-component polyurethane systems, such as are described, e.g., in US-PS No. 3,779,794. These adhesive masses are deposited in the marginal area of the glass pane with the aid of suitable extrusion nozzles, as known, e.g., from German patent application No. 2.730.831.

Within the adhesive bead 4 is installed a hose 7 made of an elastic expandable plastic material, particularly of a suitable synthetic. In the embodiment shown in FIG. 1, the hose 7 is located in the area of the adhesive bead 4 adjacent to the glass pane. The hose 7 exhibits a flat cross section, but it may also have a different cross-section, particularly a round one. The hose 7 is surrounded on all sides by an adhesive mass which is sufficiently thick so that required mechanical firmness and the tightness of the connection defined by the bead 4 are provided all around the circumference thereof.

Figure 2:
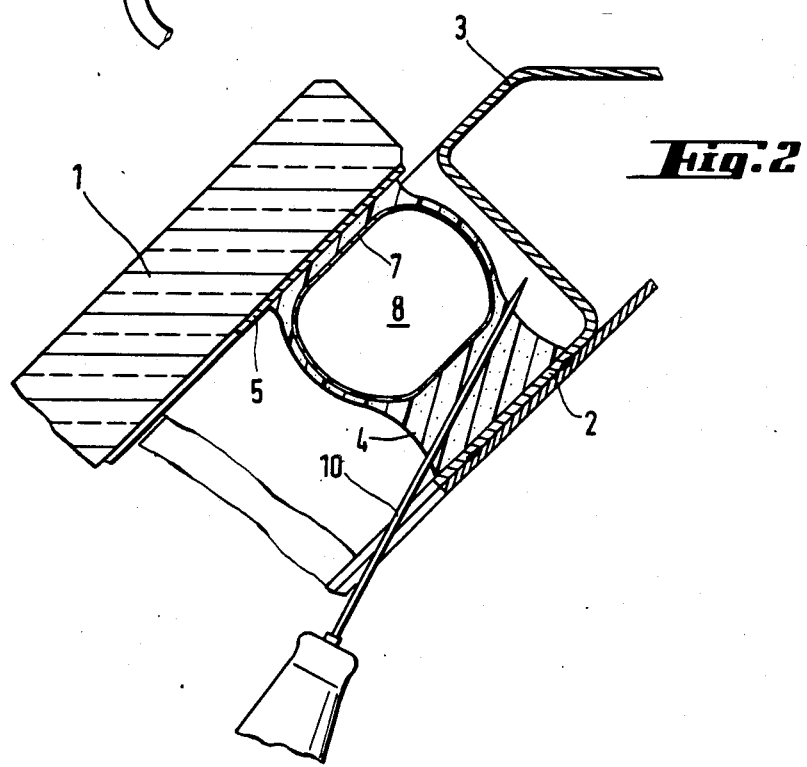
FIG. 2 shows the embodiment of FIG. 1, during the removal procedure of the glass pane.

If the glass pane is to be removed, a hollow needle 9 is inserted through the adhesive mass of the adhesive bead 4 into the hose 7, and with the aid of this needle 9, which is connected by means of a hose with an air pressure line, the hollow space 8 of the hose 7 is pressurized. This super-pressure, as is shown in FIG. 2, causes a strong expansion of the hose 7 and the adhesive bead 4, which consists of a permanently elastic material. This expansion, which has a significant component in the direction perpendicular to the glass pane 1, causes the glass pane 1 to be pressed out of the fold of the window-frame 3, in the course of which the cross section of the adhesive bead 4 is reduced perpendicularly to the direction of the expansion. The expanded distance between the glass pane 1 and the emplacement flange 2, which is obtained in this way, and also the resulting area reduction of the adhesive bead make it considerably easier to then separate the adhesive bead 4 adjacent to the hose 7 which is filled with air pressure, for example with the aid of a cutting tool 10.

A similar procedure is used for the embodiment shown in FIGS. 3 and 4. In this case too the connection between the glass pane 1 and the emplacement flange 2 is effected by an adhesive bead, in which the hose 12 made of an elastic material is embedded. In this case, if the glass pane is to be removed, the hollow space 13 of the hose 12 is filled by means of the hollow needle 9 not with a compressed gas but with pressurized liquid which rigidifies after a certain period. Liquids suitable for this purpose include, e.g., molten solid paraffin or hard wax, or hardening twin-component synthetic systems. Under the effect of the super-pressure of the liquid, the hose 12 and the adhesive bead 4 expand, in the course of which the force component which raises the glass pane 1 in a perpendicular manner presses the glass pane 1 altogether out of the window-frame 3. When the glass pane 1 has emerged sufficiently far out of the window frame fold that the adhesive bead 4 can be separated from the outside of the vehicle, one first waits until the liquid has rigidified in the hollow space 13 of the hose 12. Thereupon, the adhesive bead 4 is separated with the aid of a cutting tool 10, whereby in this case the hose 12 which is filled with the rigidified filler mass can be directly cut through without any disadvantage, since the rigidified filler continues to hold the glass pane 1 at the desired distance.

Figure 5:
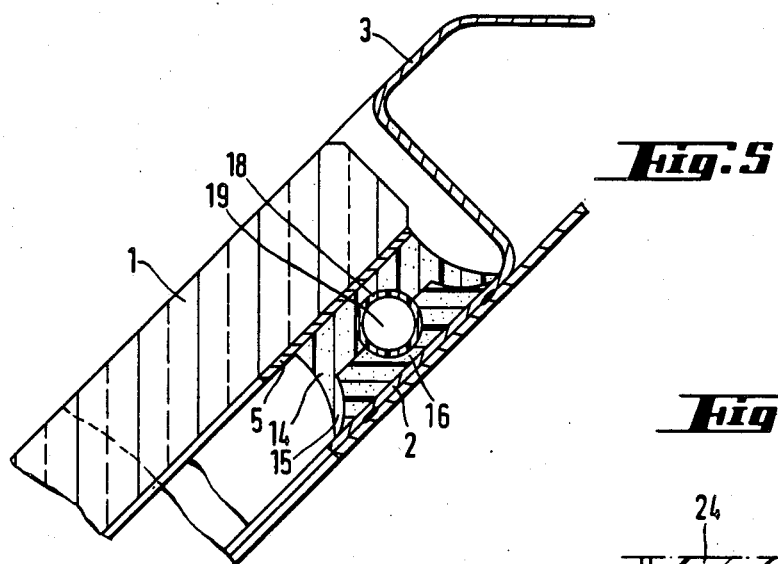
FIG. 5 shows a third embodiment of the adhesive connection according to the invention, likewise in cross-section in the area of the transition from the glass pane to the window frame.

A particularly advantageous embodiment of the invention is shown in FIG. 5. In this case, the adhesive bead connecting the glass pane 1 with the emplacement flange 2 consists of two partial beads 14 and 16. The partial bead 14 is applied to the glass pane 1 with the intermediate introduction of the frame-like coating 5. Due to the two protruding delimitation flanges 15, the partial bead 14 has a U-shaped cross-section. This partial bead 14 is applied to the glass pane 1 in a procedural step preceding the gluing onto the auto body; in fact, it is useful to do so immediately after the manufacture of the glass pane 1 in the production plant for glass panes. In this way, the glass pane 1 is pre-equipped with a hardened adhesive-section partial bead 14, which carries with it a number of advantages for the actual installation procedure into the auto body. During the installation procedure, the second partial bead 16 is applied in the channel of the section-partial bead 14 formed by the delimitation flanges 15, with the aid of an extrusion nozzle, whereupon the glass pane is installed in the normal manner.

A hose 18 made of an elastic material is embedded in the partial bead 14. It is useful for the embedding of this hose 18 to occur in such a manner that a part of the hose cross-section protrudes out of the surface of the section-adhesive partial bead 14, so that the partial bead 16 is directly in contact with this protruding portion of the hose 18. The adhesive masses forming the partial bead 14 and the partial bead 16 can usefully be made to correspond to each other in such a way that the adhesion at the interface between these two partial beads is lower than the cohesion within the material of each partial bead. Such a targeted lower adhesion can e.g. also be obtained by a targeted chemical or physical treatment of the surface of the hardened partial bead 14 prior to the application of the partial bead 16. In this manner, the interface between the two partial beads 14 and 16 constitutes a weak point along which a partial or complete separation of the two partial beads from one another can occur when the hollow space 19 of the hose 18 is filled with a pressure medium, e.g., compressed air.

It is also possible to do without the hose-shaped body in the adhesive bead, and instead to form a hollow space in the adhesive bead itself, e.g., with the aid of a suitable extrusion nozzle, which will be described below in reference to FIGS. 6 and 7.

Figure 6:
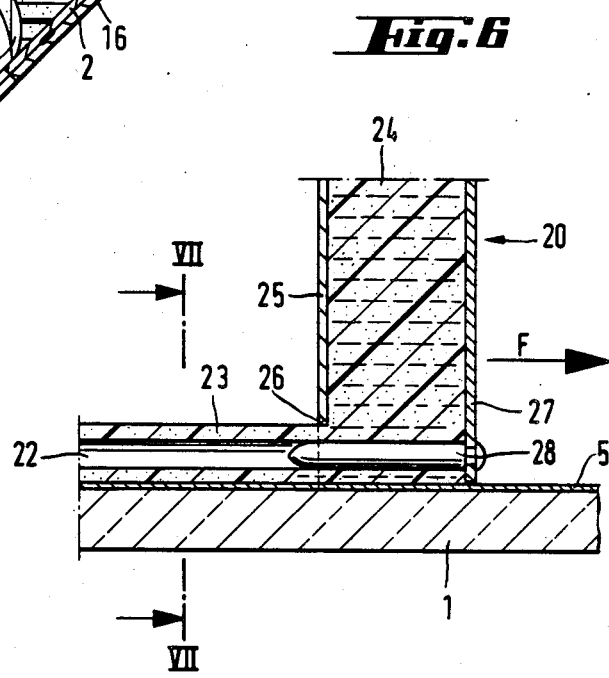
FIG. 6 is a cross-sectional view of the extrusion area of an application nozzle for an adhesive bead having a hollow space.
Figure 7:
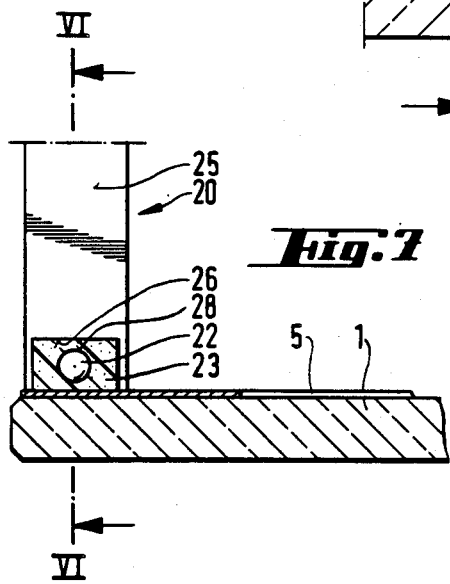
FIG. 7 is a cross-sectional view along the line VII—VII in FIG. 6.

In FIGS. 6 and 7, the nozzle 20 of an extrusion device is suited for the deposit of a bead containing a hollow space 22. The nozzle 20 is designed in a tube-shape, e.g., it has a square-shaped cross-section, and is placed vertically upon the glass pane 1 and moved across the marginal area of the glass pane to be coated in the direction of the arrow F. On the back side of the nozzle, the wall 25 is provided with a calibrated recess 26 through which the adhesive mass 24 exits and forms the section-bead 23. Opposite from the recess 26 which constitutes the mouth of the nozzle, a pin 28 attached to wall 27 intrudes into the recess 26, by means of which a desired hollow space 22 is formed in the extruded section-bead 23.

Moreover, the hollow space 22 inside the adhesive bead can be used for other purposes. If, for example, a moisture-hardening adhesive system is utilized, it is also possible to introduce water-vapor-saturated air through the hollow space, again with the aid of a hollow needle, while ensuring the ventilation of the hollow space through a second hollow needle. In this manner, the hardening process of the adhesive can be accelerated considerably. This procedure can also be utilized if the hollow space is formed by a hose embedded in the adhesive mass; in this case, however, the hose would have to be permeable for the water vapor molecules, so that the latter can diffuse through the wall of the hose into the adhesive mass.

Figure 8:
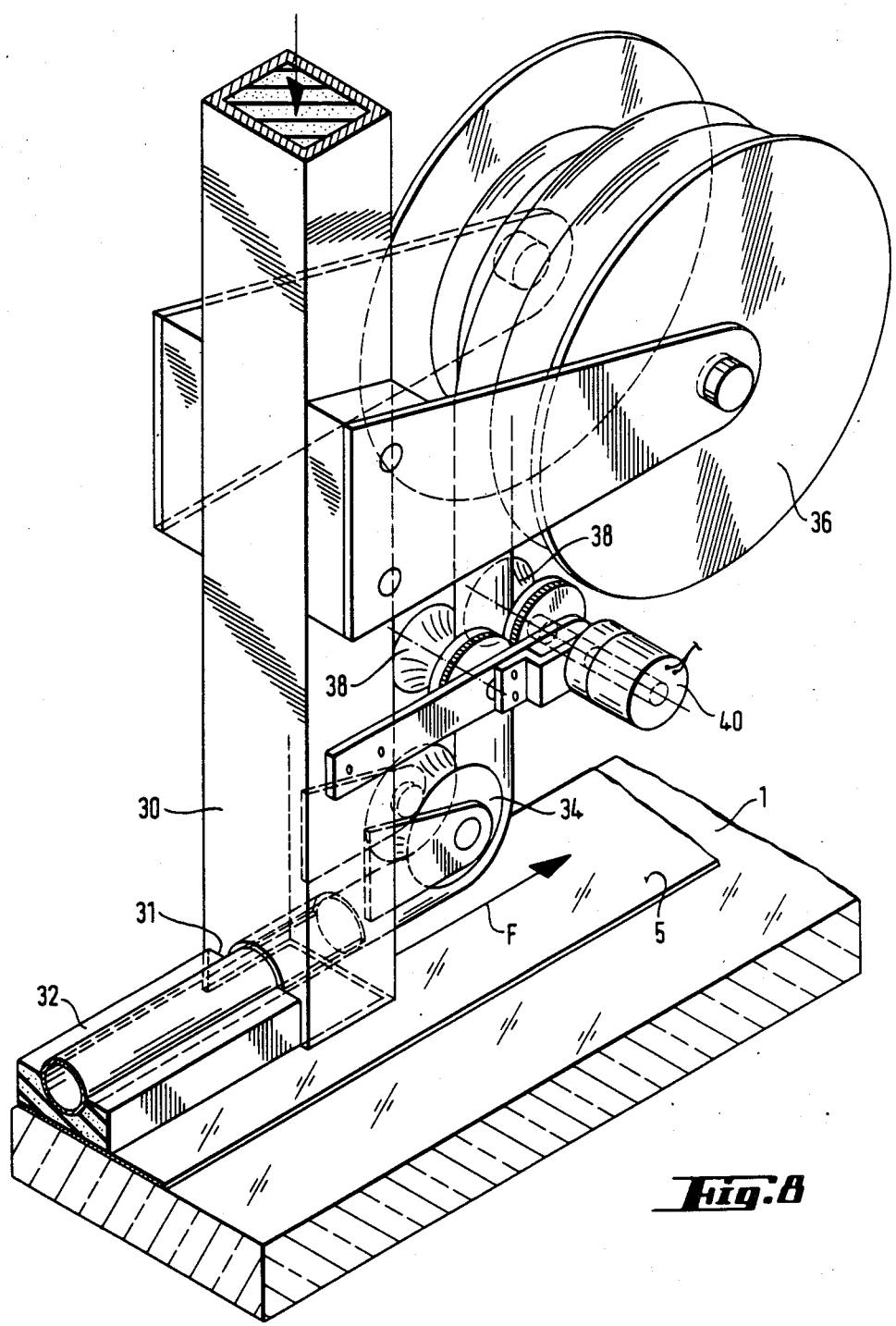
FIG. 8 is a device for the simultaneous application of an adhesive bead and a hose embedded into it.

A device by means of which glass panes with an adhesive bead can be provided with an embedded hose 18 is shown in FIG. 8. The extrusion nozzle 30, which is passed in the direction of the arrow F across the glass pane 1 is provided with a calibrated nozzle opening 31 through which the adhesive mass exits in the form of the section-bead 32. On the side of the nozzle 30 opposite from the nozzle opening 31, a guide and pressure roll 34 is installed so as to be rotatable about an axis fixed relative to the wall of the nozzle. The pressure roll 34 is provided around its circumference with a channel with which it grips the hose 18. By means of this roll 34, the hose 18 is steered out of the vertical direction into the horizontal direction and led into the nozzle 30, and thus exits from the calibrated nozzle opening 31, together with the extruded adhesive bead; in fact, embedded in the latter. The hose 18 is unrolled from a supply roll 36 installed on the extrusion nozzle and passed to the pressure roll 34 by means of the driver roller pair 38. This driver roller pair 38 is driven by the motor 40, which is controlled by a controller (not shown) sensitive to the speed of the nozzle 30, at such a velocity that the hose 18 is passed to the pressure roll 34 at the same velocity at which the nozzle 30 moves across the glass pane in the direction of the arrow F.

The embodiments described concern only the installation of auto glass panes into the window opening of an auto body. However, the invention can with the same advantages be used in the fenestration of other vehicles or in high-rise construction—i.e., anywhere where the installation of glass panes into a window frame occurs with the aid of an adhesive connection.

In the embodiments described, the adhesive bead containing the hollow space was in all cases placed on the glass pane. Obviously, however, it is equally possible to place the adhesive bead containing the hollow space onto the emplacement flange of the window-frame.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An adhesive connection between the marginal area of a glass pane and a window frame, comprising:
   an adhesive bead of adhesive material adhered to said glass pane and said window frame at said marginal area, said bead lacking flanges for gripping said glass pane from two sides; and
   means defining a fluid pressure tight hollow space completely enclosed within said adhesive bead, whereby pressurized fluid may be introduced into said hollow space for separating said glass pane from said window frame.

2. The adhesive connection according to claim 1 wherein said means defining said hollow space comprises interior delimiting surfaces of said adhesive bead.

3. The adhesive connection according to claim 1, wherein said means defining said hollow space comprises a hose embedded in said adhesive bead during the formation thereof.

4. The adhesive connection according to claim 3, wherein said hose is composed of a material with a high degree of elastic and/or plastic expandability.

5. The adhesive connection according to claim 3 wherein said adhesive bead is comprised of a moisture-hardened single-component polyurethane system.

6. The adhesive connection according to claim 5 wherein said hose is comprised of a material permeable to water vapor.

7. The adhesive connection of claim 3 wherein said hose is coextensive with the length of said hollow space.

8. The adhesive connection of claim 1, wherein said adhesive bead comprises;
   a first partial bead adhered to said glass pane;
   a second partial bead adhered between said window frame and said first partial bead; and
   a hose adhered between said first and second partial beads and comprising said means defining said hollow space.

9. The adhesive connection of claim 8 wherein said first and second partial beads includes means such that the internal cohesive strength of each said partial bead is greater than the adhesive force between said partial beads.

10. The adhesive connection of claim 1 wherein said hollow space is normally unpressurized.

11. A glass pane assembly for adhesion to a window frame, comprising:
    a glass pane having a marginal area; and
    an adhesive bead of adhesive material having a surface adhered to said glass pane, said bead lacking flanges for gripping said glass pane from both sides and having means defining a fluid pressure tight hollow space completely enclosed within said adhesive bead.

12. A glass pane assembly according to claim 11, wherein said adhesive bead comprises a hardened adhesive partial bead having a first surface adhered to said glass pane, and a fluid pressure tight hose embedded in said partial bead at a second surface of said bead opposite said first surface.

13. A glass pane assembly according to claim 12 wherein a second adhesive partial bead is applied on said hardened adhesive partial bead.

14. The adhesive connection of claim 12 wherein said hose is coextensive with the length of said partial bead.

15. The adhesive connection of claim 11 wherein said hollow space is normally unpressurized.

16. In a window frame having an emplacement flange, and a glass pane having a marginal area on one surface thereof and placed adjacent said emplacement flange, an adhesive connection between said window frame and said glass pane, said adhesive connection comprising:
 a bead of adhesive material adhered between said one surface and said emplacement flange, said bead lacking flanges for gripping said glass pane; and
 means defining an elongate fluid pressure tight hollow space completely enclosed within said adhesive bead,
 whereby pressurized fluid may be introduced into said hollow space for separating said glass pane from said window frame.

17. The window frame of claim 16 wherein said frame includes a frame portion extending substantially transverse to said emplacement flange by a distance sufficient that said glass pane is nested in said frame.

18. The window frame of claim 17 wherein said means defining a hollow space comprises a hose coextensive with the length of said hollow space.

19. The adhesive connection of claim 18 wherein said hollow space is normally unpressurized.

20. The window frame of claim 16 wherein said means defining a hollow space comprises a hose coextensive with the length of said hollow space.

* * * * *